United States Patent Office 2,770,131
Patented Nov. 13, 1956

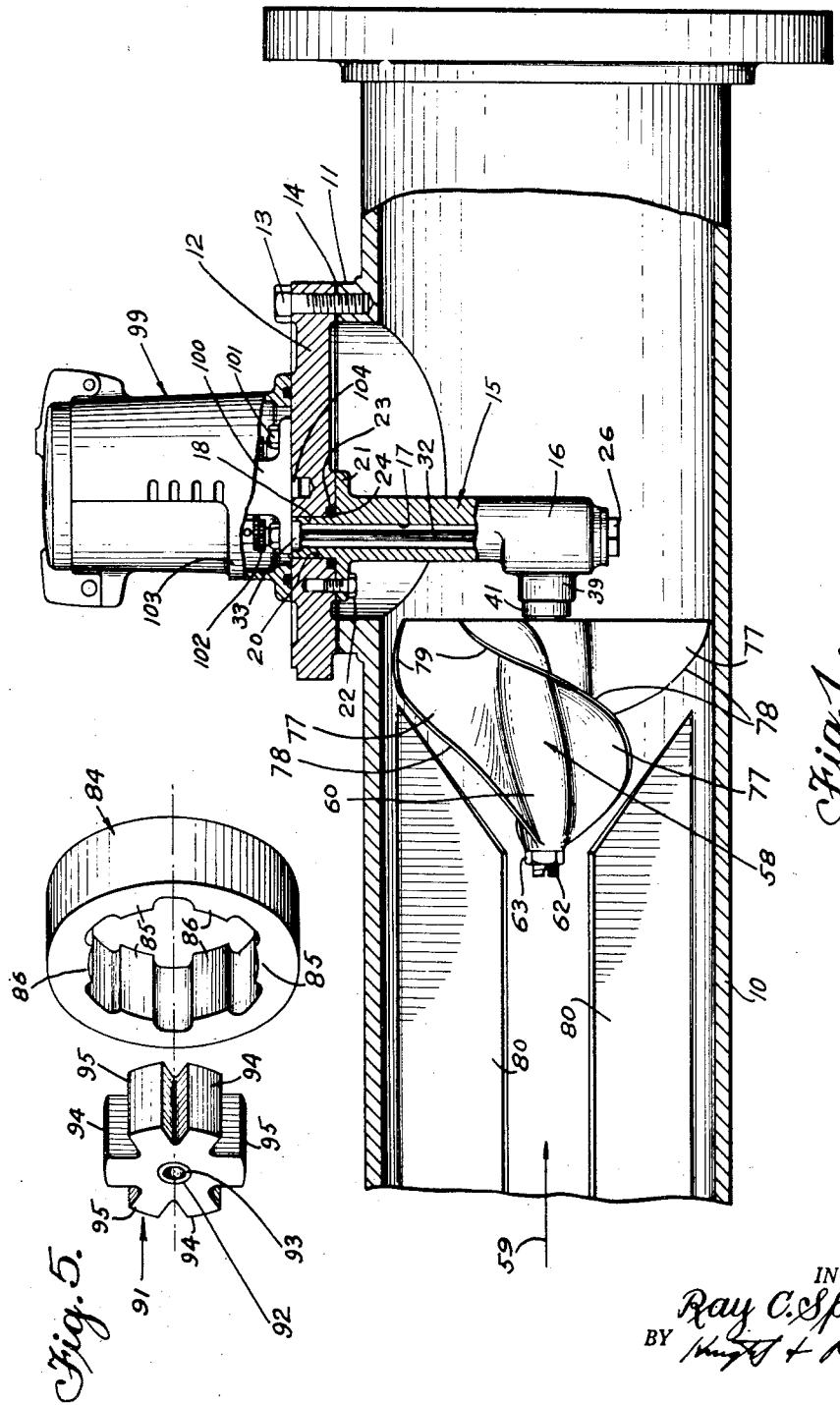

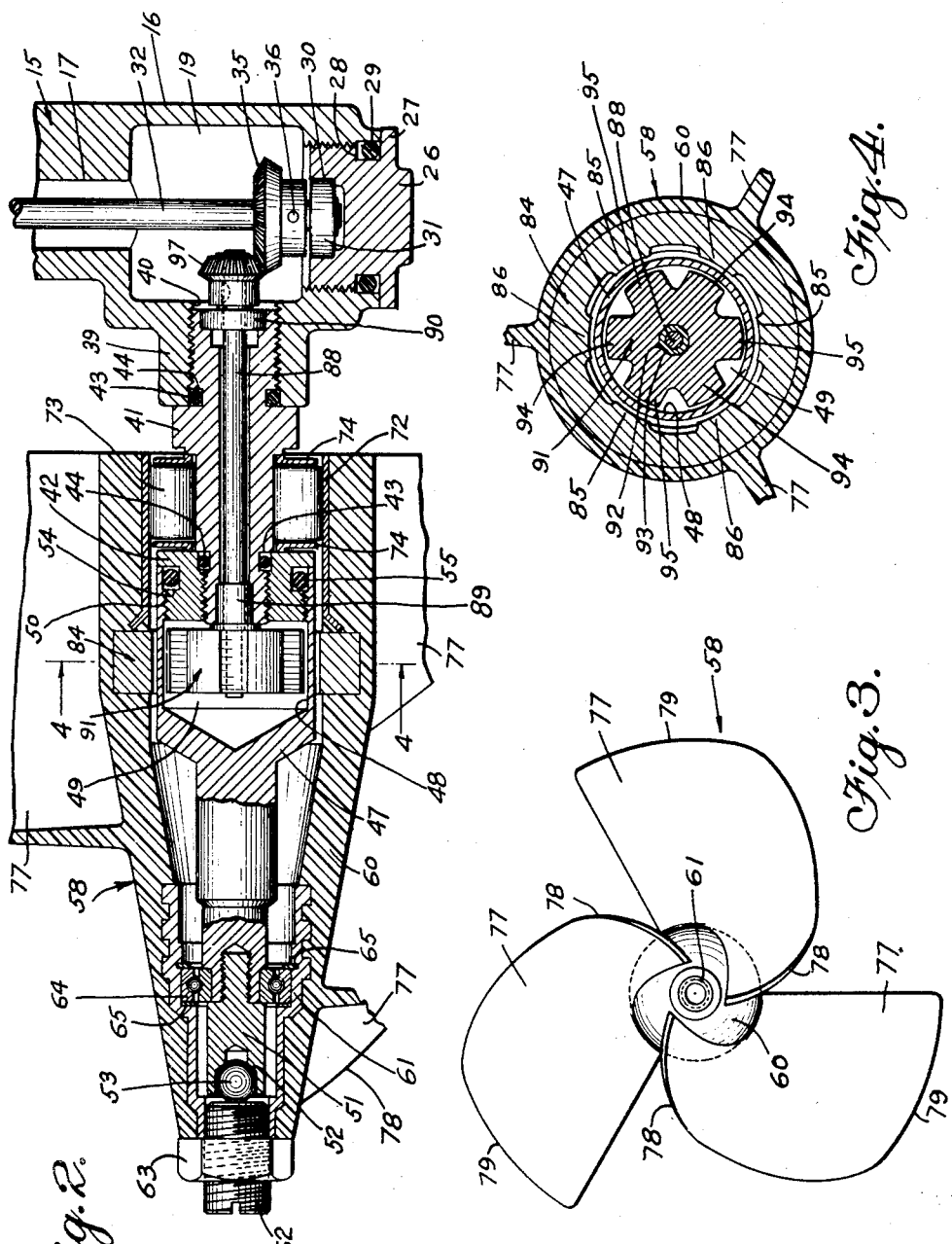

2,770,131

FLOWMETER

Ray C. Sparling, San Gabriel, Calif.

Application July 19, 1954, Serial No. 444,094

4 Claims. (Cl. 73—231)

This invention relates to improvements in measuring instruments and more particularly to flow meters for measuring and indicating flow of fluid in a conduit.

It is an object of the invention to provide an improved flowmeter having impeller and rotor elements which are coupled together in driving and driven relation by magnetic attraction between the elements.

Another object of the invention is to provide a flowmeter having driven elements thereof mounted within a conduit for conveying a fluid and in which such driven elements are sealed against contact by the fluid and thus are maintained secure against corrosive attack by the fluid and free from dirt and other foreign particles, which may be present in the fluid.

A general object of the invention is to provide an instrument for measuring flow of fluid in a conduit and/or indicating the rate of flow of the fluid, which instrument is simple in construction and positive and reliable in operation.

In certain previously known flowmeters of the general class, to which the present invention relates, an electrical system has been employed to provide for the transmission of power to a sealed-in rotor for actuation of a fluid flow registering device. In the present invention the advantages resulting from the sealing-in of a rotor are had without the need of an electrical system, whereby instruments embodying the present invention are well suited for use in environments where electrical circuits can not be employed or are disadvantageous.

Further objects and advantages of the invention will appear during the course of the following part of this specification wherein the details of construction and mode of operation of an embodiment thereof are described with reference to the accompanying drawings, in which:

Fig. 1 is a side elevation of a flowmeter embodying the invention with parts thereof being cut away to show internal parts in section;

Fig. 2 is a longitudinal central section through the driving and the driven elements of the flowmeter on an enlarged scale;

Fig. 3 is an end elevation of the driving element of the flowmeter taken in the direction of flow of fluid;

Fig. 4 is a transverse section through the flowmeter taken on line 4—4 of Fig. 3; and Fig. 5 is an exploded detail perspective view of impeller and rotor magnets contained in the illustrated flowmeter.

In the drawings, in which for the purpose of illustration, is shown a preferred embodiment of the invention, reference numeral 10 designates a meter tube which is adapted to be connected into a conduit to form a section of the conduit for conveying fluid to be measured. The tube 10 has a short tubular stem 11 integral therewith as in a T-connection, whereby the interior of the stem is open to the interior of the meter tube and the respective axes thereof are at right angles to each other. The stem 11 is closed by a cover plate 12 which is secured on the end face of the stem by means of a plurality of screws, one of which is shown at 13. Between the cover plate and the end face of the stem 11 is an annular gasket 14 for sealing the cover plate on the stem.

The cover plate serves as a support base for mounting the driving and driven elements of the flowmeter within the meter tube or conduit 10. Support for such elements is derived from an elongate gear box 15, which, in the illustrated embodiment, extends into the conduit 10 at right angles to the axis of the conduit. Gear box 15 has an enlarged portion 16 at one end thereof which is positioned centrally of the conduit. A bore 17 is formed in the gear box and it extends lengthwise of the gear box from the other end 18 of the gear box to open into a chamber 19 formed in the enlarged portion 16. Since the gear box extends into the conduit in a direction transverse of the conduit and thus at an angle to the direction of the flow of fluid in the conduit, it may be made streamlined in cross-section as indicated by the greater mass of the box at the right of the bore 17 as seen in Fig. 2, for the purpose of decreasing the amount of turbulence in the fluid flowing through the conduit; however, any turbulence in the fluid created by the presence of the gear box will not disadvantageously affect the efficiency of the flowmeter for, as will become evident as this description proceeds, the gear box is located downstream of the rotating elements of the flowmeter.

Formed in the cover plate is an aperture 20 into which the end portion 18 of the gear box is fitted for support, and there is a flange 21 around the gear box for attaching the gear box to the inside face of the cover plate as by means of screws, one of which is shown at 22. A counterbore 23 for receiving an O-ring 24 is formed in the inside face of the cover plate around the aperture 20, and such O-ring constitutes a seal preventing leakage of fluid from within the conduit through the aperture 20.

Chamber 19 constitutes a gear chamber and it is closed at the end thereof opposite the opening of the bore 17, by means of a plug 26 which is screw threaded and tightened in the enlarged portion 16 defining the gear chamber. The plug 26 has an annular flange or head 27 which is coextensive with the end face of the enlarged portion and the neck of the plug has an annular groove 28 formed therein for receiving an O-ring 29 which seals the plug fluid-tight in the enlarged portion. A recess 30 is formed in the inside face of the plug to receive an annular ball bearing assembly 31 in which one end of a shaft 32 is rotatably supported. The shaft 32 extends through the gear chamber 19 and axially in the bore 17 to project beyond the outer face of the cover plate. It is rotatably held in the end portion 18 of the gear box by means of an annular ball bearing assembly 33 fitted in the end of the bore 17. On the shaft 32 in that portion thereof within the gear chamber is a bevel gear 35 which is keyed to the shaft as by means of a pin 36.

The enlarged portion 16 of the gear box has a cylindrical extension or nipple 39 projecting from the portion 16 in a direction upstream of the direction of flow of fluid in the conduit 10 and coaxial with the conduit. The nipple 39 opens into the gear chamber 19 and is internally screw-threaded as indicated at 40 for receiving the end of a support arm 41 which is tightened in the nipple and thereby arranged coaxial with the conduit 10. At its upstream end the support arm is externally threaded to receive an annular adapter or nut 42. The support arm is provided with annular grooves 43 for receiving O-ring seal 44 where the arm is connected to the nipple 39 and where the arm is engaged by the downstream end portion of the nut 42.

Positioned upstream of the support arm and in axial alignment with the arm is an axle section 47 which is formed of brass or other suitable material and has an enlarged cylindrical portion at the downstream end thereof in which is formed bore 48 to define a chamber 49. The wall defining the bore 48 is screw threaded as indicated at 50 for engagement with screw threads around the outside cylindrical wall of the annular nut 42 whereby the nut serves as an adapter for supporting the section 47 on the end of the support arm 41 and for closing the chamber 49.

A cylindrical screw 51 is made to fit tight on the upstream end of the axle section 47 and in axial alignment with the section 47. At its upstream end the screw 51 is provided with a ball socket 52 for receiving a ball 53 which functions as a thrust bearing as will be described shortly.

As thus far described it is clear that the support arm 41, the section 47 and the screw 51 are secured together in end to end axially aligned relation so as to constitute a unitary structure projecting axially of the conduit 10 from the enlarged end portion 16 of the gear box 15 to which the structure is fixedly secured. As thus constructed and arranged such unitary structure constitutes a fixed axle on which the driving member of the flowmeter is rotatably supported. It is to be noted, too, that such axle contains the chamber 49 intermediate the ends of the axle and which is sealed against passage of fluid from the conduit into the chamber. The chamber is made fluid tight around the connection of the adapter 42 and the wall of the bore 48 in the intermediate section 47 of the axle, by means of an annular groove 54 formed in the outside wall of the adapter to accommodate seal ring 55.

Reference numeral 58 designates generally an impeller constituting the driving member of the flowmeter. It is formed preferably of plastic and is driven by fluid flowing in the conduit 10 in the direction indicated by arrow 59. The impeller 58 has a hub 60 which fits over the axles 41—47—51 and comprises a conical forward or upstream portion and a cylindrical rearward or downstream portion. There is a metal sleeve or insert 61 molded within the forward end portion of the hub. At its forward end the sleeve 61 is internally threaded to receive a thrust screw 62 which is provided with a nut 63 for locking the screw 62 in a set position axially in the forward end of the impeller hub. The inside end face of the screw 62 bears against the ball 53 and thereby functions as a thrust bearing which minimizes the tendency of the impeller to wobble or gyrate about its axis in its rotation on the axle of the flowmeter. The inside wall of the sleeve 61 is formed to provide cylindrical sections of increasing diameter from its forward or upstream end to its downstream end so as to receive an annular ball bearing assembly 64 which is held secure around the axle of the flowmeter by the inside end face of the head of thrust screw 51 on the end of the axle. The outside diameter of the ball bearing assembly 64 is such that it will fit tightly and coaxially in the sleeve 61 whereby the sleeve rotatably supports the hub of the impeller on the axle. There is a retainer ring 65 fitted within a groove provided therefor on the inside wall of the sleeve 61 and such retainer ring is arranged flush against the downstream end face of the bearing assembly 64 so as to prevent inadvertent axial movement of the impeller in an upstream direction with respect to the axle as would cause the impeller to slide off from the axle.

At its downstream end and arranged to form the inside wall thereof, the hub 60 is provided with a metal insert or sleeve 72 which is molded in place inside the hub. In order to secure the sleeve 72 to the inside wall of the hub, the downstream end of the sleeve is flared outwardly for anchoring it in the plastic material of the hub. The sleeve 72 provides a cylindrical inside surface for the hub which is engaged by a circumferentially arranged series of roller bearing 73 around the support arm 41 whereby the hub is rotatably supported at its downstream end on the axle of which the support arm constitutes a section. Roller bearings 73 are retained in place around the axle as by means of retainer rings 74, one for each end face of the roller bearings and these retainer rings are in turn maintained in their respective positions by being engaged by annular shoulder provided on the axle as clearly shown in the drawing.

Integral with the hub and extending radially outwardly therefrom are three impeller blades or vanes which are designated by reference numeral 77. These vanes are of a width increasing from the forward end of the hub to greatest breadth intermediate the forward and rearward ends thereof to provide an inclined forward edge 78 for the vanes and a peripheral edge 79 which is cut back from the point of greatest breadth to the rearward edge of the blades so as to be spaced slightly from the inside wall of the conduit 10. In extending from the forward end to the rearward end of the hub the impeller blades extend around the hub in a helical configuration so as to be driven by fluid flowing in the conduit in the direction indicated by arrow 59.

Intermediate the ends of the impeller hub so as to be positioned around the chamber 49 and molded inside the hub is an annular permanent magnet 84, the inside diameter of which is substantially equal to the inside diameter of that portion of the hub in which the magnet is embedded. This magnet may be made from conventional materials some of which, as are well known to those skilled in the manufacture of magnets, possess high magnetic stability. The inside wall of the magnet 84 is provided with a plurality of uniformly spaced apart cut-out portions which define radially inwardly projecting portions 85 and 86. These inwardly projecting portions which form poles for the magnet with the several north poles, as designated by numeral 85, alternating around the magnet with the several south poles 86.

The annular magnet 84 being integral with the mass of the impeller is rotated on its axis around the outside surface of the wall defining the fluid-tight chamber 49 within the axle of the flowmeter. Since the poles of the magnet are directed centrally of the magnet it becomes evident that its lines of magnetic force will be directed inwardly thereof and thus will pass through the walls defining the chamber 49 whereby the magnet is effective in driving the rotor element of the flowmeter as is described immediately hereinafter.

The rotor of the flowmeter is mounted and sealed in the axle of the flowmeter against contact by fluid passing in the conduit 10. To this end the support arm section 41 of the axle is provided with an axial bore 87 which extends from end to end of the section 41 so as to open into the chamber 49 and into the gear chamber 19. A shaft 88 is arranged axially in the bore 87 and is rotatably supported therein at its forward end portion by means of a bearing 89 force fitted within the opening at the forward end of the bore 87 and is rotatably supported at its rearward end portion by an annular ball bearing assembly 90. The forward end of the shaft 88 projects into the chamber 49 where it supports a rotor magnet 91 which, as best shown in Fig. 5 of the drawing, is of right cylindrical form and has an axially extending bore 92 therein. There is a steel insert or bushing 93 in the bore 92 and such bushing serves to support the rotor magnet 91 non-rotatably on the end of the shaft 88 whereby the shaft will be driven by the rotor magnet.

Around the outside cylindrical surface of the rotor magnet is a plurality of uniformly spaced apart notches extending in axially aligned direction and these notches define radially outwardly projecting portions 94 and 95 constituting poles for the magnet with the several north poles being designated by numeral 94 and alternating around the periphery of the magnet with the several south poles 95 thereof. It will be seen that the number of poles on the rotor magnet is equal to the number of poles on the impeller magnet 84. Thus when the impeller is positioned over the axle of the flowmeter so that the impeller magnet and the rotor magnet lie in a common plane normal to the axis of the impeller and its axle, the north poles on the rotor magnet will become aligned in mutually attractive relation to the respective south poles of the impeller magnet, and the south poles of the rotor magnet will become aligned in mutually attractive relation to the respective north poles of the impeller magnet so that the magnets 91 and 84 become fixedly coupled together and rotation of one will impart a corresponding rotation of the other.

It is clear therefore that as the impeller is rotated by the flow of fluid against the helical vanes 77 on the impeller, the impeller magnet will impart a corresponding rotation to the rotor within the axle of the flowmeter. The two magnetically coupled elements rotate at the same velocity, and each revolution of the impeller causes one revolution of the inner rotor.

At its rearward end the rotor shaft 88 has a bevel gear 97 suitably keyed thereto so as to be rotated by the shaft. Gear 97 meshes with bevel gear 35 which drives the shaft 32. Since the shaft 32 projects through the cover plate 12 it provides a rotating element which is accessible exteriorly of the conduit 10 for attachment to a suitable registering device for translating the speed of rotation of the shaft into measurements of the volume of flow of fluid through the conduit or into indications of the rate of flow of fluid in the conduit.

For the purpose of completeness of disclosure, a suitable registering device is shown in the drawing and it is designated generally by reference numeral 99. The details of construction of the registering device 99 form no part of the present invention and accordingly no detailed description of the internal mechanism of such a device is presented herein since any conventional registering device may be employed in the present invention as will be understood by those skilled in measuring instruments. Suffice to say that the illustrated registering device 99 has a centrally arranged support 100 which is mounted on the outside surface of the cover plate as by bolts 101. The outside end of the shaft 32 has a drive gear 102 keyed thereto which meshes with known driven gears within the registering device which in turn are operatively connected to means for registering the extent of rotation thereof as is imparted thereto from the flowmeter parts above described. Numeral 103 designates a suitable cover for the registering device 99 and such cover is mounted on the cover plate as by means of a pin 104 which passes through the support 100 and is seated in a recess provided therefor in the cover plate.

It is to be understood that the form of my invention herein shown and described, is a practical and preferred example of the same, and that changes may be resorted to within the scope of my invention, which is not limited to the details disclosed herein but is to be accorded the full scope of the claims so as to embrace any and all equivalent structures.

I claim:

1. A flowmeter comprising, in combination with a fluid conduit: a fixed support member mounted within the conduit; and elongated axle secured to said support member and projecting upstream therefrom axially of the conduit; an impeller having an axially elongated bore closed at its upstream end and surrounding said axle, and having vanes for rotating the impeller in response to longitudinal flow of fluid in the conduit; bearing means rotatably supporting the upstream portion of said impeller on said axle adjacent the upstream end of the axle; additional bearing means spaced longitudinally from the first mentioned bearing means, rotatably supporting the downstream end portion of the impeller on the axle; said axle having a hollow portion intermediate said two bearing means defining an enclosed cylindrical chamber within the axle; a rotor having a shaft mounted rotatably within said axle and a driven permanent magnet secured to said shaft and located within said enclosed chamber; and a driving permanent magnet secured coaxially to said impeller at a position intermediate the length of said bore and surrounding said driven magnet to rotatably couple said impeller to said rotor.

2. A flowmeter comprising, in combination with a fluid conduit: a fixed support member mounted within the conduit; a support arm secured to said support member, projecting upstream therefrom axially of the conduit and having a central bore extending longitudinally therethrough; an axle section secured to said support arm and projecting upstream therefrom axially of the conduit and having an enlarged cylindrical wall portion defining an enclosed chamber; an impeller having an axially elongated central bore closed at its upstream end and surrounding said axle section and said support arm and having vanes for rotating the impeller in response to longitudinal flow of fluid in the conduit; bearing means rotatably supporting the upstream portion of said impeller on said axle section at a position upstream of said enclosed chamber; additional bearing means spaced longitudinally from the first mentioned bearing means, rotatably supporting the downstream end portion of the impeller on said support arm at a position downstream of said chamber; a rotor having a shaft mounted rotatably within said support arm and extending through the central bore thereof, and a driven permanent magnet secured to said shaft and located within said enclosed chamber; and a driving permanent magnet secured coaxially to said impeller at a position intermediate the length of the bore of said impeller and surrounding said driven magnet to rotatably couple said impeller to said rotor.

3. A flowmeter comprising, in combination with a fluid conduit: a fixed support member mounted within the conduit; an elongated axle secured to said support member and projecting upstream therefrom within the conduit; an impeller having an annular hub surrounding said axle and vanes projecting outwardly from said hub for rotating the impeller in response to longitudinal flow of fluid in the conduit; bearing means rotatably supporting the upstream portion of said impeller hub on said axle adjacent the upstream end of the axle; additional bearing means spaced longitudinally from the first mentioned bearing means, rotatably supporting the downstream portion of the impeller hub on the axle; said axle having a hollow portion intermediate said two bearing means defining an enclosed chamber within the axle; a rotor having a shaft mounted rotatably within said axle and a driven permanent magnet secured to said shaft and located within said enclosed chamber; and a driving permanent magnet secured coaxially to said impeller hub at a position intermediate the length of said hub and surrounding said driven magnet to rotatably couple said impeller to said rotor.

4. A flowmeter comprising, in combination with a fluid conduit: a fixed support member mounted within the conduit; a support arm secured to said support member, projecting upstream therefrom within the conduit and having a central bore extending longitudinally therethrough; an axle section secured to said support arm and projecting upstream therefrom within the conduit and having an enlarged cylindrical wall portion defining an enclosed chamber; an impeller having an annular hub surrounding said axle section and said support arm and having vanes projecting outwardly from said hub for rotating the impeller in response to longitudinal flow of fluid in the conduit; bearing means rotatably supporting the upstream portion of said impeller hub on said axle section at a position upstream of said enclosed chamber; additional bearing means spaced longitudinally from the first mentioned bearing means, rotatably supporting the downstream portion of the impeller hub on said support arm at a position downstream of said chamber; a rotor having a shaft mounted rotatably within said support arm and extending through the central bore thereof, and a driven permanent magnet secured to said shaft and located within said enclosed chamber; and a driving permanent magnet secured coaxially to said impeller hub at a position intermediate the length of said hub and surrounding said driven magnet to rotatably couple said impeller to said rotor.

References Cited in the file of this patent

UNITED STATES PATENTS

| | | |
|---|---|---|
| 943,405 | Havard | Dec. 14, 1909 |
| 2,386,505 | Puchy | Oct. 9, 1945 |
| 2,443,856 | Hermanny | June 22, 1948 |

FOREIGN PATENTS

| | | |
|---|---|---|
| 126,550 | Austria | Jan. 25, 1932 |
| 957,568 | France | Aug. 29, 1949 |
| 678,135 | Great Britain | Aug. 27, 1952 |